US009746135B2

(12) United States Patent
Bathurst

(10) Patent No.: US 9,746,135 B2
(45) Date of Patent: Aug. 29, 2017

(54) SYSTEM AND PROCESS FOR EQUALIZATION OF PRESSURE OF A PROCESS FLOW STREAM ACROSS A VALVE

(75) Inventor: Christopher Francis Bathurst, Christchurch (NZ)

(73) Assignee: Solray Holdings Limited, Christchurch (NZ)

( * ) Notice: Subject to any disclaimer, the term of this patent is extended or adjusted under 35 U.S.C. 154(b) by 970 days.

(21) Appl. No.: 13/696,799

(22) PCT Filed: May 5, 2011

(86) PCT No.: PCT/NZ2011/000067
§ 371 (c)(1), (2), (4) Date: Jan. 22, 2013

(87) PCT Pub. No.: WO2011/139166
PCT Pub. Date: Nov. 10, 2011

(65) Prior Publication Data
US 2013/0126002 A1 May 23, 2013

Related U.S. Application Data

(60) Provisional application No. 61/332,412, filed on May 7, 2010.

(51) Int. Cl.
*G05D 16/20* (2006.01)
*F17D 1/14* (2006.01)
(Continued)

(52) U.S. Cl.
CPC .................. *F17D 1/14* (2013.01); *B09B 3/00* (2013.01); *C10G 1/008* (2013.01); *F04B 9/10* (2013.01);
(Continued)

(58) Field of Classification Search
CPC ........... G04D 16/2013; G04D 16/2026; G04D 16/2033; G04D 16/2066; B01D 35/14;
(Continued)

(56) References Cited

U.S. PATENT DOCUMENTS 2,219,488 A * 10/1940 Parker ........................... 417/300
3,585,104 A 6/1971 Kleinert
(Continued)

FOREIGN PATENT DOCUMENTS

CN 101522760 A 9/2009
DE 19703324 A1 8/1998
(Continued)

OTHER PUBLICATIONS

International Search Report ("ISR") and Written Opinion dated Sep. 13, 2011, regarding PCT Application No. PCT/NZ2011/000066.
(Continued)

*Primary Examiner* — Katherine Zalasky
(74) *Attorney, Agent, or Firm* — Arent Fox LLP

(57) ABSTRACT

According to one embodiment, a system and process for the equalization of pressures of a flow stream across one or more valves is provided. A process circuit having clean non-abrasive fluid and at least one slave cylinder for transmitting pressure to a process flow stream is employed.

7 Claims, 4 Drawing Sheets

(51) Int. Cl.

| | |
|---|---|
| ***F04B 9/10*** | (2006.01) |
| ***B01D 35/157*** | (2006.01) |
| ***F17D 1/20*** | (2006.01) |
| ***B09B 3/00*** | (2006.01) |
| ***C10G 1/00*** | (2006.01) |
| *B01D 37/04* | (2006.01) |

(52) U.S. Cl.
CPC .......... *F17D 1/20* (2013.01); *G05D 16/2066* (2013.01); *B01D 35/157* (2013.01); *B01D 37/046* (2013.01); *C10G 2300/1014* (2013.01); *Y02P 30/20* (2015.11); *Y10T 137/0379* (2015.04)

(58) Field of Classification Search
CPC .............. B01D 35/1475; B01D 35/157; B01D 35/1573; B01D 35/1576; B01D 37/046; B01D 37/043; B01D 2201/20; B01D 2201/202; F16K 1/38; F16K 1/54; F16K 1/385; F16K 1/52; F16K 1/526; F04B 9/10; F04B 2205/09; F04B 2205/01; F04B 2205/05; F04B 2205/07
See application file for complete search history.

(56) References Cited

U.S. PATENT DOCUMENTS

| | | | |
|---|---|---|---|
| 4,017,642 | A | 4/1977 | Orth |
| 4,427,453 | A | 1/1984 | Reitter |
| 4,486,459 | A | 12/1984 | Thompson |
| 4,599,240 | A | 7/1986 | Thompson |
| 5,041,192 | A | 8/1991 | Sunol |
| 5,313,871 | A | 5/1994 | Kaneko |
| 5,395,455 | A | 3/1995 | Scott |
| 5,735,916 | A | 4/1998 | Lucas et al. |
| 6,283,217 | B1 | 9/2001 | Deaton |
| 6,296,061 | B1 | 10/2001 | Leismer |
| 6,589,422 | B2 | 7/2003 | Low |
| 6,620,292 | B2 | 9/2003 | Wingerson |
| 2006/0149015 | A1 | 7/2006 | Cornish et al. |
| 2008/0057555 | A1 | 3/2008 | Nguyen |
| 2008/0274494 | A1 | 11/2008 | Kertz |
| 2008/0312479 | A1 | 12/2008 | McCall |
| 2009/0081742 | A1 | 3/2009 | Dunlop |
| 2009/0126274 | A1 | 5/2009 | Vogel |
| 2009/0148918 | A1 | 6/2009 | Trimbur |
| 2009/0181438 | A1 | 7/2009 | Sayre |
| 2010/0050502 | A1 | 3/2010 | Wu |
| 2010/0261922 | A1 | 10/2010 | Fleischer |

FOREIGN PATENT DOCUMENTS

| | | | |
|---|---|---|---|
| EP | 2006354 | A2 | 12/2008 |
| WO | 2007129921 | A1 | 11/2007 |
| WO | 2008105618 | A | 9/2008 |
| WO | 2008134836 | A2 | 11/2008 |
| WO | 2009028969 | | 3/2009 |
| WO | 2009064204 | A2 | 5/2009 |
| WO | 2009071541 | A2 | 6/2009 |
| WO | 2009117402 | A2 | 9/2009 |
| WO | 2010030197 | A1 | 3/2010 |
| WO | 2010121366 | | 10/2010 |
| WO | 2011139165 | A1 | 11/2011 |
| WO | 2011139166 | A1 | 11/2011 |

OTHER PUBLICATIONS

European Search Opinion completed Jun. 24, 2014, regarding EP Application No. EP11777628.6.

Supplementary European Search Report completed Jun. 6, 2014, regarding EP Application No. EP11777628.6.

International Preliminary Examination Report dated Sep. 4, 2012, regarding EP Application No. EP11777628.6.

Yang, Y.F. et al., “Analysis of energy conversion characteristics in liquefaction of algae”, Resources Conservation & Recycling, 2004, vol. 43(I) pp. 21-33. See abstract, sections: 2.1 Algae preparation, 2.3 Reaction conditions and 2.4 Separation and analysis.

Supplementary European Search Report completed May 28, 2014, regarding EP Application No. EP11777627.8.

International Search Report (“ISR”) and Written Opinion dated Aug. 10, 2011, regarding PCT Application No. PCT/NZ2011/000065.

International Preliminary Report on Patentability dated Sep. 4, 2012, regarding PCT/NZ2011/000065.

European Search Opinion dated Jun. 6, 2014, regarding EP Application No. EP11777627.8.

European Search Opinion dated Apr. 15, 2014, regarding EP Application No. EP11777629.

Supplementary European Search Report completed Apr. 15, 2014, regarding EP Application No. EP11777629.

International Search Report (“ISR”) and Written Opinion dated Aug. 10, 2011, regarding PCT Application No. PCT/NZ2011/000067.

International Preliminary Report on Patentability and Written Opinion dated Aug. 10, 2011, regarding PCT/NZ2011/000067.

First Examination Report dated Jun. 13, 2013, regarding New Zealand Application No. 603395.

First Office Action dated Jul. 14, 2014, regarding Chinese Patent Application No. CN201180023113.8.

* cited by examiner

SYSTEM AND PROCESS FOR EQUALIZATION OF PRESSURE OF A PROCESS FLOW STREAM ACROSS A VALVE

CROSS-REFERENCE TO RELATED APPLICATIONS

This application is a National Stage completion in the United States of International Application No. PCT/NZ2011/000067, filed on May 5, 2011, entitled "System, and Process for Equalization of Pressure of a Process Flow Stream Across a Valve," of which claims the benefit of U.S. Provisional Application No. 61/332,412 entitled "SYSTEM AND PROCESS FOR EQUILIZATION OF PRESSURE OF A PROCESS FLOW STREAM ACROSS A VALVE" filed on May 7, 2010, and which is hereby expressly incorporated herein by reference in its entirety.

FIELD

The present disclosure relates to systems and methods for equalizing pressure of a process stream across a valve.

BACKGROUND

The sustainability and environmental suitability of conventional fuel sources have become a concern. Because of the increasing environmental concerns associated with the combustion of hydrocarbons, and the variable cost of oil, the suitability of alternative fuels is being investigated and is gaining acceptance.

Accordingly, the use of organic materials such as algae and lignocellulosic biomasses are increasingly considered promising alternative fuel sources.

Process plants have been designed for the conversion of such organic raw materials. Typically, several pumps and valves are employed for pressurizing the process and controlling flows of the process stream. The organic materials within the process flow streams are generally composed of abrasive and/or potentially corrosive fluid. The flow streams can also contain various organic particles of sludge. These flow stream characteristics can cause considerable pressure differentials throughout the system during pressurization phases of the process. The flow streams flow at increased velocities that can damage valves and other process equipment.

These high pressure flow streams can be extremely corrosive to valves and component parts of the system. Degradation of the valves and component parts of the system increase cost of maintenance and give rise to safety issues within the process plant.

Improved systems and methods for equalizing pressure of a process stream across a valve are herein disclosed.

SUMMARY

According to one embodiment, a system and process for the equalization of pressures of a flow stream across one or more valves is provided. A process circuit having clean non-abrasive fluid and at least one slave cylinder for transmitting pressure to a process flow stream is employed.

The foregoing and other objects, features and advantages of the present disclosure will become more readily apparent from the following detailed description of exemplary embodiments as disclosed herein.

BRIEF DESCRIPTION OF THE DRAWINGS

The following drawings form part of the present specification and are included to further demonstrate certain aspects of the present disclosure. The disclosure may be better understood by reference to one or more of these drawings in combination with the detailed description of specific embodiments presented herein.

DETAILED DESCRIPTION

Figure 1:
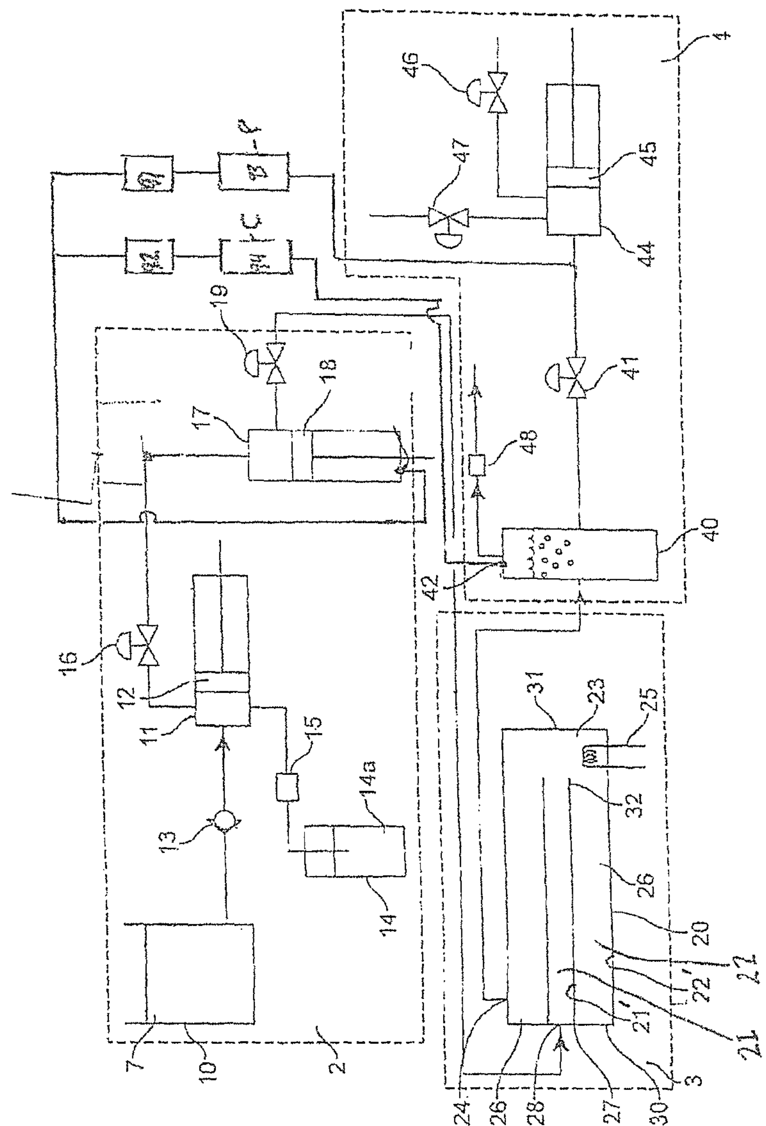
FIG. 1 illustrates an exemplary system for processing solid-liquid slurries according to one embodiment.

The disclosure relates to a system and method for equalization or equilibration of the process flow stream pressures across one or more valves within a system. It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, methods, procedures and components have not been described in detail so as not to obscure the embodiments described herein.

The processes and systems herein disclosed employ non-abrasive clean fluid streams which are separated from corrosive or abrasive solid-liquid slurries to be processed. These non-abrasive clean fluid streams allow valves (e.g. needle valves) to be opened and closed without abrasion and corrosive effects as would otherwise be caused by solid-liquid slurries herein disclosed. The pressure across valves within processes and systems herein disclosed are equalized by use of slave cylinders which allow pressure equalization while maintaining the separation of the clean fluid source from process streams, such as solid-liquid slurries. This can be coordinated with several needle valves and slave cylinders such that pressure is equalized throughout the entire process. As a result of the equalization of pressures, upon opening of the process valves, the solid-liquid slurries will not reach the high velocities, which damage process components.

A process for high pressure, high temperature treatment of solid-liquid slurry feedstock, such as dry cleaning sludge, biosolids sludge, de-lignitised sludge and algae for production of alternative petrochemical feedstock is described in PCT/NZ2008/000309 filed Nov. 17, 2008 and published as WO 2009/063204. Said application is expressly incorporated herein by reference in its entirety.

FIG. 1 illustrates an exemplary system 1 for processing solid-liquid slurries according to one embodiment. FIG. 1 should be viewed in relation to FIG. 3 which illustrates a valve pressure equalization process circuit, which connects with and forms a part of the system 1. System 1 includes a pressurizing section 2, a processing section 3 and an output section 4. The pressurizing section 2 pressurizes the solid-liquid slurry feedstock 7 to be processed; the processing section 3 heats and processes the pressurized feedstock 7, then cools a resultant raw product stream; and the output section 4 depressurizes and outputs the product stream.

The feed stock 7 can be made up of various organic materials to be converted to useful hydrocarbon fuels, for example dry cleaning sludge, biosolids sludge, de-lignitised sludge and/or algae for production of hydrocarbons. Generally, the feed stock 7 can be any bio or organic material which can be processed in a system with high pressures for conversion to crude oil, hydrocarbons or green chemicals. Such feedstock can also contain abrasive and or “dirty” particulate matter, which is abrasive and/or corrosive to valves and component parts of the system. Also, if certain flow velocities are reached and in the absence of controls to avoid such velocities, then valves and component parts of the system 1 can be damaged. The solid-liquid slurry feedstock 7 can also be referred to as sludge, fluid, biomass, concrete or other terms indicative of the organic material to be converted to alternative petrochemical feedstock, such as crude oil, hydrocarbons and/or green chemicals.

The feedstock enters the pressurizing section 2 is pressurized before being processed by the processing section 3. The pressurizing section 2 includes a feed tank 10 connected to a first pump 11 via a conduit on which is located a nonreturn valve 13.

The first pump 11 includes a first piston 12 that moves up and down within a cylinder and that is driven by any suitable means. However, if alternative forms of pump are used, the piston may be replaced with other suitable pumping means as would be apparent to a person skilled in the art.

The first pump 11 is configured to draw feedstock 7 from the feed tank 10 and provide an initial low pressurization. For example, the feedstock 7 can be drawn from the feed tank 10 by moving the ram to create a vacuum. This causes the feedstock 7 to move from the feed tank 10 to the first pump 11 via the conduit and non-return valve 13. The non-return valve 13 prevents the feedstock 7 from moving back toward the feed tank 10.

The pressurizing section 2 also optionally contains an additive tank 14, adapted to contain an additive 14*a*. The additive tank is connected with an additive pump 15 that pumps one or more additives to the first pump 11 via a conduit that connects the additive tank 14 to the first pump 11. This creates a feedstock 7 and additive 14*a* mixture in the first pump 11.

A first valve 16 is positioned on a conduit connected with the first pump 11 and with pressurizing means, in the form of a second pump 17. The first valve 16 can be closed to allow the first pump 11 to mix the feedstock 7 with the additive 14*a* within the pump 11, and the valve can be opened to allow the feedstock/mixture to be pumped from the first pump 11 to the second pump 17 via the conduit.

After being discharged from the feed tank 10, the feedstock 7 can be an abrasive or corrosive flow stream that is pumped through the various conduits or lines, valves reactors, and/or separations units in the process.

The second pump 17 is a high pressure pump that includes a pump housing in the form of a cylinder within which a second floating piston or piston 18 is located. The second piston 18 is able to slide back and forth along the cylinder in the usual manner. If alternative forms of pump are used, the piston may be replaced with other pumping means as would be apparent to a person skilled in the art.

The second pump 17 is configured to pressurize the solid-liquid slurry feedstock 7 exiting the pump 11 and valve 16. In particular, the pump 17 is configured so that one side of the piston 18 is adapted to be in contact with a clean non-abrasive fluid, which has been pressurized independently by a conventional separate pumping system connected with the second pump. The non-abrasive fluid is generally a clean or pure fluid such as water or oil. As opposed to the solid-liquid slurry feedstock, the non-abrasive fluid on the other side of the pump piston does not contain corrosive or abrasive particulate matter and therefore will not abrade, corrode or clog valves in the system 1. Accordingly, such fluid is referred to as clean or pure.

The system works by pumping the solid-liquid slurry feedstock 7 into the cylinder of the second pump 17 by opening the first valve 16 and actuating the first pump 11. As the solid-liquid slurry feedstock 7 enters the second pump, the second piston 18 is caused to move along the cylinder and push the non-abrasive pure fluid out from the other end of the cylinder and into a clean liquid source or reservoir (shown in FIG. 3) via an open release valve.

The second pump 17 is also connected with a second valve 19. After the feedstock 7 is pumped into the second pump 17 by the first pump 11, the first and second valves 16 and 19 are closed.

The pure fluid remaining in the second pump is then pressurized by the separate pump. This causes the piston 18 to transmit the pressure of the pure fluid by pushing against the solid-liquid slurry feedstock 7, thereby pressurizing the feedstock/mixture in an indirect way.

The second valve 19 can then be opened to allow the pressurized solid-liquid slurry feedstock 7 to be moved from the second pump 17 to the processing section 3.

The first and second valves 16, 19; first and second pumps 11, 17; and first and second pistons 12, 18, all form part of the pressurizing section 2.

Although the indirect pressurization has been described in relation to a pump having a cylinder with a floating piston therein, other forms of pump may be used instead, as would be appreciated by a person skilled in the art.

Optionally, the system can be adapted to allow the feedstock 7 to be moderately preheated in the pressurizing section 2 by including heating means (not shown) along a section of the conduit, or in other suitable locations.

The processing section 3 includes processing means for heating pressurized feedstock 7 to supercritical temperatures. Typically, the feedstock 7 will be heated to a temperature between 250° C. and 400° C. However, it is envisaged that the system and process of the invention may also be used to process feedstock 7 at temperatures outside this range.

The feedstock 7 can be pressurized in the pressurizing section 3 and the feedstock 7 can alternatively or additionally be pressurized/further pressurized in the processing section 3.

The processing means can include a processing vessel 20 that includes a first stage 21 and a second stage 26, and a first end 30 and a second end 31 that substantially opposes the first end 30. An opening is positioned at or near the first end 30 of the pressure vessel and is connected to the outlet of the second valve 19.

The first stage 21 of the pressure vessel is essentially a first tube 21' having a first end 27 that connects with the opening to form an inlet 28 to the pressure vessel 20. The first tube 21' is positioned concentrically within a second tube 22' that forms the casing of the pressure vessel 20. A space 26 (preferably an annular space) is provided between the outer peripheral surfaces of the first tube 21 and the inner surfaces of the second tube 22. This space defines the second stage 22 within the processing vessel 20 and leads to the outlet 24.

The first tube 21' is shorter than the processing vessel 20 and comprises a distal end 32 that terminates before the second end 31 of the processing vessel 20. A space is provided between the distal end 32 of the first tube 21' and the second end 31 of the processing vessel 20. This space forms a reaction zone or reaction chamber 23 where pressurized, high temperature feedstock 7 reacts to form a raw product stream. The inlet 28, first stage 21, reaction zone 23, second stage 22, and outlet 24 form a fluid pathway along which the solid-liquid slurry feedstock 7 passes through the pressure vessel 20. The inner and outer surfaces of both the first and second tubes 21' 22' are heat transfer surfaces.

Each end 30, 31 of the processing vessel 20 is sealed, except where the inlet 28 enters the vessel 20 and where the outlet 24 exits the vessel. This arrangement allows the processing vessel 20 to be used as a pressure vessel in which the same pressure is maintained within the vessel.

In use, feedstock 7 enters the first stage via the inlet 28. The solid-liquid slurry feedstock 7 moves through the fluid flow path defined by the first stage 21 and is heated before reaching the reaction zone 23, where the feedstock 7 is further heated to a desired temperature by heating means 25 that causes the feedstock 7 to react to form a raw product stream. Raw product stream can also be an abrasive and/or corrosive flow stream containing raw product from the processing vessel 20.

The heating means 25 is configured to heat the pressurized feedstock 7 in the reaction chamber 23 up to between 250° Celsius and 400° Celsius. The heating means 25 may be in the form of an element or other suitable heating means. The heating means 25 can be inserted directly into the reaction chamber 23 to heat the feedstock 7 or it can be adapted to be located externally from the reaction chamber 23 so as to heat the walls of the processing vessel 20 at or near the location of the reaction chamber 23.

The heating means 25 can heat the pressurized solid-liquid slurry feedstock 7 in the reaction chamber 23 by radiation, convection, conduction, electromagnetic radiation, including microwave and ultrasonic radiation, or any combination of such heating methods or by similar heating methods.

The raw product and any unreacted feedstock 7 then moves along the flow stream defined by the second stage 22 where the raw product stream is cooled to an ambient or near ambient temperature, for example at or below 80° Celsius, before being discharged from the processing section 3 via the outlet 24.

In effect, the first and second tubes 21, 22 form a counter-flow heat exchanger, with the first tube 21 being made of a highly heat conductive material, such as a thin walled metal tube, to ensure a high heat transfer co-efficient. In addition, fins or other surface features that improve heat transfer may be incorporated onto or into the heat transfer surfaces of the processing vessel 20, tubes 21, 22 or reaction chamber 23.

The outlet 24 of the pressure vessel 20 is located on the periphery of the processing vessel 20 close to the inlet 28. However, it is envisaged that the outlet 24 could be located at other suitable locations on the processing vessel 20 depending on the internal arrangement of the vessel.

In one form, the volume of the processing vessel 20 is at least six times that of the swept volume of the second pump 17. This volume difference enables the solid-liquid slurry feedstock 7 to be moved through the processing vessel in intermittent stages as the pump 17 is actuated. That is, one cycle of the pump 17 would cause a single charge of the solid-liquid slurry feedstock 7 to move one sixth of the way through the processing vessel 20, thereby allowing for a longer residence time of the solid-liquid slurry feedstock 7 within the processing vessel 20 than if the same charge of flow stream was pushed into the processing vessel with the actuation of the pump 17 and was drawn out of the processing vessel 20 with the next consecutive action of the pump. By allowing for a longer residence time, the solid-liquid slurry feedstock 7 is able to be heated to the desired temperature easily and is given sufficient time to undergo the desired reaction within the processing vessel.

As mentioned above, the first and second tubes 21', 22' of the processing vessel 20 are preferably concentric, with the first tube 21' being positioned inside the second tube 22' and defining an annular space 26 between. However, it is envisaged that the first and second stages of the processing vessel 20 can be of different shapes and arrangements, as would be apparent to a person skilled in the art. For example, the processing vessel could comprise a housing having an inlet and an outlet and a counter-flow heat exchange system in between. Such arrangements allow incoming solid-liquid slurry feedstock 7 to be heated by heating means and by the outgoing solid-liquid slurry feedstock 7 that has already been heated. Similarly, the outgoing solid-liquid slurry feedstock 7 is cooled by the incoming solid-liquid slurry feedstock 7 and by being separated from or distanced from the heating means.

Alternatively, the processing vessel 20 can include any other suitable arrangement by which the solid-liquid slurry feedstock 7 can be held under pressure whilst being heated and then cooled.

Referring now to the output section 4 of the system 1, the outlet 24 connects the processing vessel 20 to the output section 4 via a conduit. The discharged raw product, which can also be abrasive or corrosive, moves along this conduit to the output section 4.

The output section 4 optionally includes a high pressure gas separator 40 for separating out gases from the raw product stream. In the embodiment in which a gas separator is used, the outlet 24 of the processing vessel 20 is connected with the inlet of the high pressure gas separator 40, which may be of a known type, so that raw product 8 moves from the processing vessel 20 to the gas separator 40 via a conduit. Any gases entrained, or formed in the processing vessel 20, and which remain within the feedstock 7, are able to exit the system by being purged from the gas separator 40 through a purge valve 48 connected with the gas separator 40.

The output section also includes a third valve 41 that is connected with the outlet 24 of the processing vessel 20 or with an outlet 42 of the gas separator, if the gas separator 40 is included within the system 1. The third valve 41 is also connected with a third pump 44.

The third pump 44 is a high pressure pump that acts as both a depressurizing means and as a discharge pump. In particular, the third pump 44 includes a pump housing in the form of a cylinder within which a floating third piston 45 is located. One side of the piston 45 is in contact with the raw product stream as it enters the third pump 44. The other side of the piston 45 is in contact with a pure fluid, such as water, which is the pressurized output of a separate conventional pumping system connected with the third pump 44. As the raw product stream enters the cylinder via the open third valve 41, the piston presses against the pure fluid at the other end of the cylinder and the fluid is pushed out into a reservoir (not shown) via an open release valve at the pure fluid end of the cylinder.

The third valve 41 is controlled to open at the same time as the first valve 16 in the pressurizing section 2. This allows a charge of product to leave the processing section 3 at the same time as a charge of solid-liquid slurry feedstock 7 enters the processing section 3, via the first valve 16, without significantly changing the pressure level in the processing section 3. The release valve acts to automatically maintain the pressure within the third pump 44 at about the same pressure as in the processing system 3, and as created by the pump action of the second pump 17 as the second pump transfers the charge of feedstock 7 into the processing section 3. When the transfer of the new charge of feedstock 7 is complete and the transfer of the latest charge of product is complete, both the second valve 19 and third valve 41 are closed. Further opening movement of the third piston 45 continues. This causes the capacity of the feedstock end of the cylinder to increase, thereby depressurizing the feedstock 7. Preferably, the raw product stream is depressurized to ambient or near ambient levels.

Any gases that were dissolved in the raw product stream and that were not purged in the gas separation stage can then be ejected via a fourth valve 47, which is connected with the third pump 44 and which can also act to depressurize the raw product stream.

The third pump 44 is also connected with a fifth valve in the form of an outlet valve 46. This allows the depressurized raw product stream to be pumped, by actuation of the third pump 44, out through the outlet valve 46, which is opened to allow the raw product stream to be discharged from the system.

Because the raw product stream is at an ambient or near ambient pressure, the outlet valve 46 is subject to less wear and is, therefore, more reliable than if the raw product stream was discharged through the outlet valve under high pressure.

The fourth valve 47 helps to reduce the pressure of the raw product stream in the third pump 44 after the third valve 41 has closed but before the outlet valve 46 has opened, so that rapid wear is avoided when the outlet valve 46 is opened.

The above describes one embodiment of a generalized process for conversion of solid-liquid slurry feedstock 7 to alternative petrochemical feedstock that can include for instance, crude oil, hydrocarbons and/or green chemicals.

Figure 2:
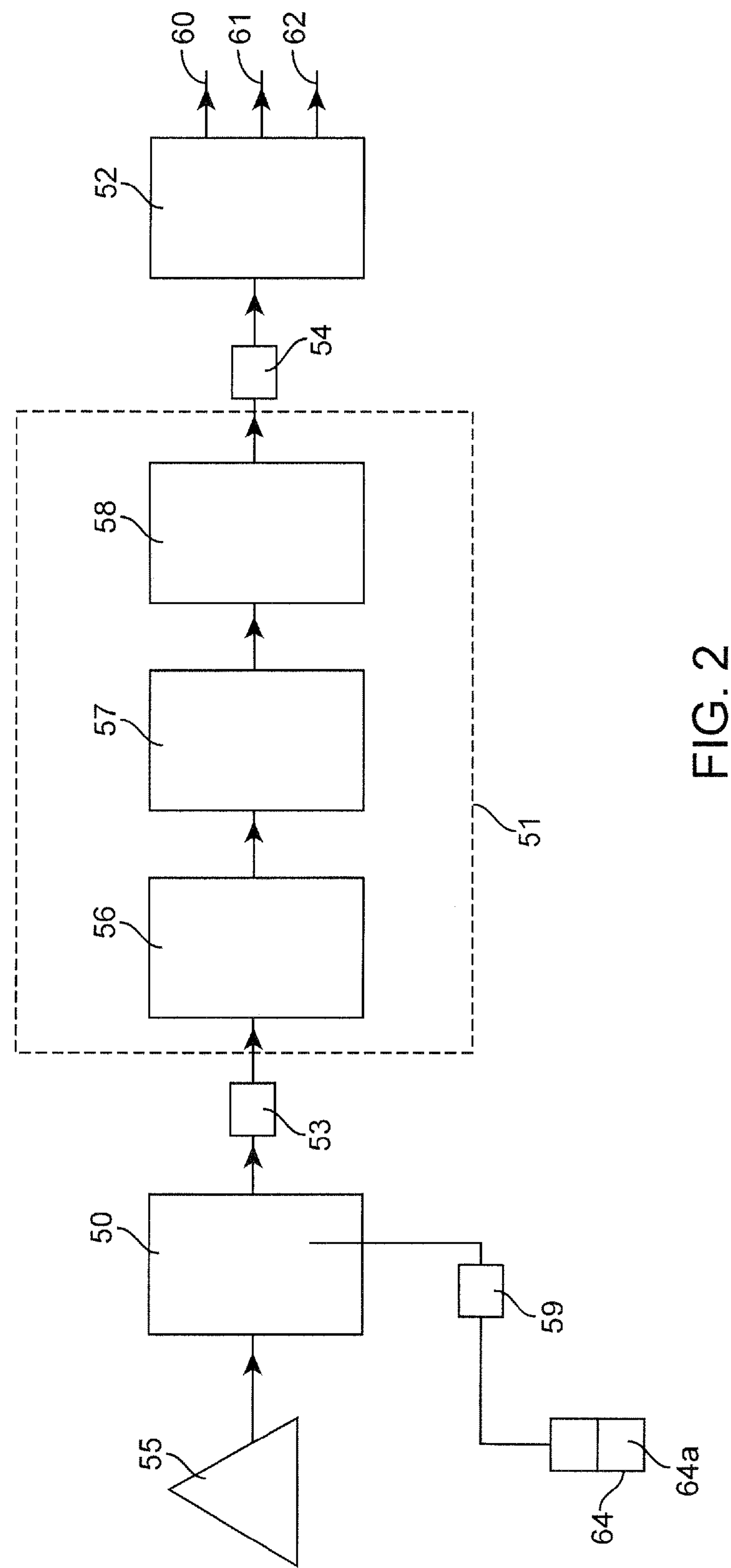
FIG. 2 illustrates an exemplary system for processing solid-liquid slurries according to another embodiment.

FIG. 2 illustrates an exemplary system for processing solid-liquid slurries according to another embodiment. The process includes: a preparation stage 50, a processing stage 51, and a separation stage 52. The preparation stage 50 can take a raw material 55 to be processed and form it into solid-liquid slurry feedstock 53. The processing stage 51 pressurizes and heats the solid-liquid slurry feedstock 53 to a predetermined optimal temperature and pressure to convert the solid-liquid slurry feedstock 53 into a raw product stream 54 that is cooled and depressurized in a controlled manner. The raw product stream 54 can be an alternative petrochemical feedstock including, but not limited to crude oil, hydrocarbons, green chemicals and/or water. The separation stage 52 separates gas from the raw product stream 54.

In an exemplary embodiment, one or more additive(s) 64*a* from an additive tank 64 can be added to the raw material 55 in the preparation stage 50 via additive pump 59 to form the solid-liquid slurry feedstock 53.

The processing stage 51 pressurizes and heats the solid-liquid slurry feedstock 53 to predetermined optimal temperatures and pressures to cause a reaction in the solid-liquid slurry feedstock 53. A raw product 54 is produced by heating and pressurizing the solid-liquid slurry feedstock 53 in the processing stage. The processing stage can include a pressurizing section 56, a processing section 57 and an output section 58. The pressurizing section 56 pressurizes the solid-liquid slurry feedstock 53. The processing section 57 heats the pressurized solid-liquid slurry feedstock 53 and cools the resultant raw product stream 54. The output section 58 depressurizes and outputs the raw product 54. The raw product 54 can be cooled and depressurized in a controlled manner. The raw product 54 can contain a desirable product produced in the processing section 57 or can be a material that is free from, or has a lower level of, contaminants that were removed.

In the separation stage 52, gas can be separated from the raw product 54. The discharged raw product stream 54 is passed through a product separator to be separated into one or more product sub-streams 60, 61, and 62. This may be achieved by solvent extraction, distillation, settling, membrane filtration, centrifuging, ion exchange, drying, evaporation, vacuum distillation/separation or any other suitable separation process or combination of processes as would be readily apparent to a person skilled in the art.

In an exemplary embodiment, product sub-streams 60, 61, 62 including a hydrocarbon oil rich stream are produced. The hydrocarbon oil rich stream can be used in place of crude oil or similar product for producing materials such as diesel, aviation fuel, lubricating oil, petrol, or similar products.

The process can be used to remove contaminants from the solid-liquid slurry feedstock 53 or the process can be used to produce a product, such as a product containing hydrocarbons or crude oil that may be suitable for use as a fuel. Thus, the product stream 54 can contain a desirable product produced in the processing stage or the product stream may be a material that is free from, or has a lower level of contaminants.

Figure 3:
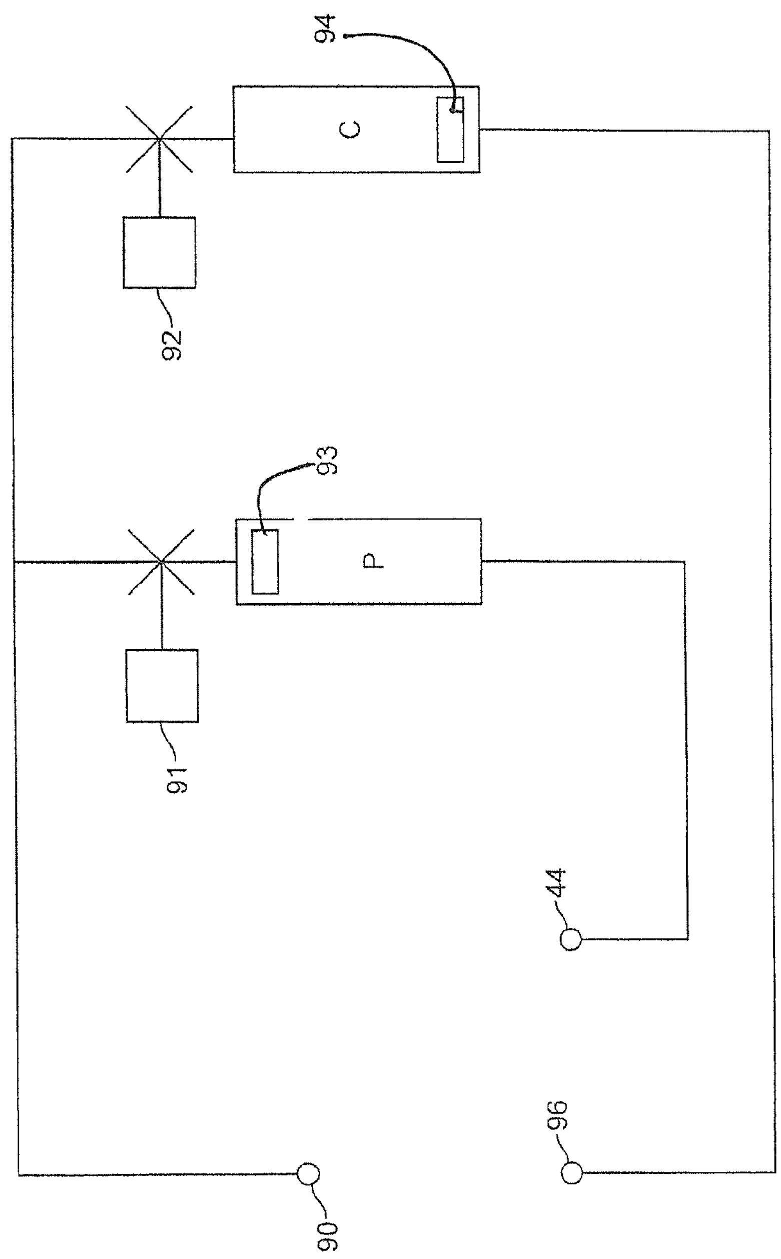
FIG. 3 illustrates an exemplary system for equalizing pressures across a process valve according to one embodiment.

FIG. 3 illustrates an exemplary system for equalizing pressures across a process valve according to one embodiment and can be implemented in the system of FIG. 1 or FIG. 2.

Referring again to FIG. 1, valve 19 is positioned downstream from pump 17 and just prior to the processing vessel 20. The term downstream can refer to any relative point in the process which is further toward the outlet of the process, for example toward the outlet valve 46 in FIG. 1. Upstream can refer to any relative point in the process which is further toward the inlet of the process, for example toward the feed tank 10 in FIG. 1.

Prior to commencement of pump 17, there will be a large difference in pressure across valve 19 (shown in FIG. 1). Without equalizing the pressure of the feedstock (which can be an abrasive and/or corrosive stream) on either side of the valve 19, the process stream can have the effect of abrading and corroding the valve 19 upon opening of the valve and pumping the flow stream therethrough. A similar pressure difference will occur across valve 41 in the process flow as illustrated in FIG. 1.

Accordingly, there will be a pressure P1 upstream from valve 19, a pressure P2 in the flow stream between valves 19 and 41 (which includes reactor vessel 20 and high pressure gas separator 40), and a third pressure P3 downstream from valve 41 (shown in FIG. 1). These pressures should all be equalized prior to commencement of the second pump 17.

Referring now to FIG. 3, a clean fluid source or reservoir 90 is shown. As described above with respect to FIG. 1, the second piston 18, located with the second pump 17 has on one side the abrasive or corrosive flow stream which is to be converted to an alternative petrochemical product, and on the other side a clean non-abrasive fluid stream, which is pressurized independently by a conventional separate pumping system connected with the second pump 17 (shown in FIG. 1). The clean non-abrasive fluid source 90 supplies the clean non-abrasive fluid stream to the clean non-abrasive fluid stream side of piston 18. In other embodiments, other clean non-abrasive fluid sources can be used.

Further illustrated in FIG. 3 is a needle valve 92 with a slave cylinder C arranged downstream from the needle valve 92. The slave cylinder C contains a piston 94 capable of reciprocation, namely sliding back and forth along the cylinder C. On the side of the slave cylinder C having needle valve 92 is the clean non-abrasive fluid. Accordingly, the clean non-abrasive fluid is contained within the line from the pump piston 18, in the clean fluid source 90 across the needle valve 92 and to slave cylinder C. This way, the fluid passing through and on either side of the needle valve 92 is clean and will not abrade the needle valve 92. The needle valve 92 is configured to prevent flow of the clean non-abrasive fluid when closed, and upon actuation and opening to permit fluid flow therethrough.

On the other side of the slave cylinder C is a line connected with separator 96 containing the flow stream that can be abrasive and/or corrosive. By means of the barrier of the piston 94 in slave cylinder C, the flow stream is prevented from contaminating the clean non-abrasive fluid on the other side of the piston 94. However, because the piston 94 slidingly reciprocates freely within the slave cylinder C, the pressure on either side of the slave cylinder C can be equalized.

The pressure on either side of the piston 94 is equalized prior to opening of the needle valve 92 by positioning the piston within the slave cylinder C at a designated point. Namely, the piston 94 will slide toward the top of the cylinder and the pressure of the clean non-abrasive fluid on one side of the slave cylinder C will be equal to the pressure of the flow stream (potentially abrasive and/or corrosive) on the other side of the cylinder C. The position of the piston 94 can be predetermined to equalize the pressure on either side of the piston 94. The clean fluid properties, the flow stream fluid properties, the process or system pressure, the process or system temperature and the characteristics of the process or system volume including vessels, conduits and pumps can be used to determine the initial position of the piston 94 to equalize the pressure on either side of the piston 94. Further, because the line is connected to the clean non-abrasive liquid on the one side of piston 94, this pressure will equalize with the pressure of separator 96 (analogous to gas separator 40 in FIG. 1). Moreover, the pressure will be the same on the other side of piston 94 (abrasive flow stream side of piston 94), thus resulting in an equalization of the flow stream pressure on the pump 17 side of valve 19 (shown in FIG. 1) with the flow stream pressure on the other side of valve 19 (shown in FIG. 1), including separator 96. In this way, pressure P1 (upstream from valve 19) of the abrasive flow stream can be equalized with pressure P2 (between valve 19 and valve 41 shown in FIG. 1).

However, if pressure is too great on one side or the other of slave cylinder C, the piston 94 may not be able to slide further in either the top or bottom of the cylinder and thus the pressure would not be equalized. Therefore, the initial position of the piston within any working slave cylinder must be predetermined as discussed above in order to assure an equalization of pressure across any valve associated with or corresponding to the working slave cylinder.

Similar to the above, the clean non-abrasive fluid source 90 is also connected with needle valve 91 with slave cylinder P arranged subsequent to needle valve 91. Slave cylinder P contains a piston 93 capable of reciprocation, namely sliding back and forth along the cylinder. Such cylinder P begins with the piston 93 at the top of the cylinder prior to commencement of the charge stroke by pump 17 (shown in FIG. 1). The lower end of slave cylinder P is connected with pump 44 (shown in FIG. 1) on the flow stream (e.g., product flow stream) side of piston 45 (shown in FIG. 1).

Upon opening of needle valve 91, the pressure will equalize. Therefore, the pressure downstream from valve 41 including pump 44 (shown in FIG. 1), will equalize with the pressure of the flow stream upstream from valve 19 (shown in FIG. 1). Accordingly, the pressure P1 (upstream from valve 19) of the flow stream will equalize with pressure P3 (downstream from valve 19).

Just before commencement of the charge stroke by pump 17 (shown in FIG. 1), pressures P1, P2, and P3 are equalized by opening valves 91 and 92. This enables pressure differences to be transmitted via slave cylinders P and C as described above, thus ensuring that the pressure at pump 17 (shown in FIG. 1) equals the pressure at 44 separator 96 (in FIG. 3) or gas separator 40 (in FIG. 1) and pump 44 (shown in FIG. 1). Because of this equalization of pressures, valves 19 and 41 (shown in FIG. 1) can then be opened without wear.

After opening of valves 19 and 41 (shown in FIG. 1), needle valve 91 (shown in FIG. 3) is then closed. Subsequent to the closure of needle valve 91, the charge stroke by pump 17 (shown in FIG. 1) is commenced. Such stroke can occur by the pressurization and pushing of the piston 18 (shown in FIG. 1) against the flow stream and through valve 19 (shown in FIG. 1).

At the end of the charging stroke by pump 17 (shown in FIG. 1), the piston 94 in cylinder C will have naturally returned to the bottom of the slave cylinder C by the increased pressure from the non-abrasive water source at piston 18 (shown in FIG. 1) due to the charging action. The needle valve 92 and valves 19 and 41 (shown in FIG. 1) can then be closed.

Further, just prior to the discharge stroke by pump 44 while valve 46 (shown in FIG. 1) is still closed, the pressure is raised by action of piston 45 (shown in FIG. 1) with valve 91 opened and the pressure at pump 18 (shown in FIG. 1) discharged. The piston 93 in slave cylinder P is thereby raised to the top. At the end of the discharge stroke by pump 44 (shown in FIG. 1), valve 91 is also then closed.

Because the pistons 94 and 93 in slave cylinders C and P respectively have been reset, and the raw product stream discharged through outlet valve 46 (shown in FIG. 1), the pumping cycle is complete and can be repeated.

By this cycle the non-abrasive fluid is provided for the needle valves 91 and 92 while also equalizing pressures across valves 19 and 46 (shown in FIG. 1). In this way the high pressure abrasion of component parts can be avoided.

Figure 4:
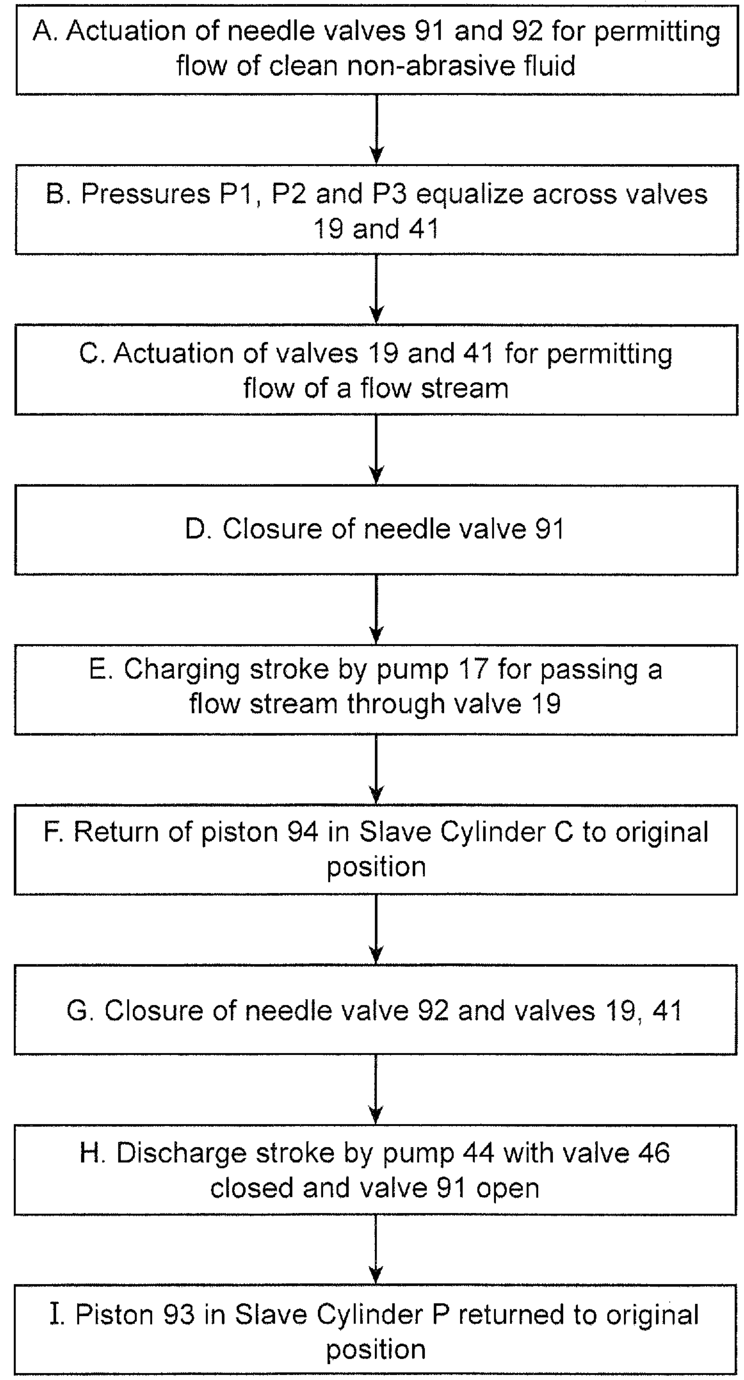
FIG. 4 is illustrates a flowchart of an exemplary process for equalizing pressures across a process valve according to one embodiment.

FIG. 4 is illustrates a flowchart of an exemplary process for equalizing pressures across a process valve for use in the systems disclosed herein (e.g., system of FIG. 1 and FIG. 2). The flowchart illustrated in FIG. 4 is described also in reference to the component parts of the systems illustrated in FIG. 1 and FIG. 3. The process begins prior to the commencement of the charging stroke by pump 17. Accordingly, after feedstock 7 has been drawn in by pump 11 past non-return valve 13 and first valve 16, pump 17 is then configured for providing a charging stroke for urging the sludge through to processing vessel 20, separator 40 to pump 44. However, as shown in step A of FIG. 4, prior to commencement of the charge stroke, needle valves 91 and 92 are opened to permit flow of the clean non-abrasive fluid. Accordingly, the piston in the respective slave cylinders C, P will move thereby transmitting pressures. Consequently, as shown in step B, the pressure of the feedstock 7 on either side of the valves 19 and 41 will equalize such that pressures P1, P2 and P3 will be about equal.

After the pressures P1, P2, and P3 equalize, then valves 19 and 41 are actuated as shown in step C to permit flow of feedstock 7 or raw product therethrough. Furthermore, according to step D of FIG. 4, the needle valve 91 will then be closed followed by commencement of the charge stroke as shown in step E. This stroke will urge the feedstock flow stream to the processing vessel 20 and separator 40. Due to the pressure generated by the stroke, and because needle valve 92 is still open, the piston 94 in the slave cylinder C will be returned to its original position at the bottom of the cylinder as shown in step F.

After the charge stroke, needle valve 92 is closed along with valves 19 and 41. Subsequently, pump 44 will then commence its discharge stroke as shown in step H. At this time, valve 46 is closed, and needle valve 91 will be opened. Due to the pressure of the stroke and because needle valve 91 is open, piston 93 in slave cylinder P will be returned to its original position at the top of the cylinder. This completes the pressure equalization process and reset of the slave cylinders C, P. The process can then be repeated.

Example embodiments have been described hereinabove regarding improved systems, process and methods for equalizing pressure of a process stream across a valve. Various modifications to and departures from the disclosed example embodiments will occur to those having ordinary skill in the art. The subject matter that is intended to be within the spirit of this disclosure is set forth in the following claims.

What is claimed is:

1. A process for equalizing pressure of a flow stream comprising an abrasive fluid across a first process valve, said process comprising:

providing a flow steam, wherein said flow stream comprises an abrasive fluid;

providing a first pump including a first pump piston having a first pump piston side and a second first pump piston side, said first pump piston side in said flow stream;

providing a first process valve downstream of said first pump piston side of said first pump piston in said flow stream; wherein a first pressure is provided on an inlet side of said first process valve and a second pressure is provided on an outlet side of said first process valve;

providing a first slave cylinder including a first slave cylinder piston having a first first slave cylinder piston side and a second first slave cylinder piston side, wherein said second slave cylinder piston side of said first slave cylinder piston is in fluid communication with said flow stream;

providing a first non-abrasive fluid line connecting said second pump piston side of said first pump piston with said first slave cylinder piston side of said first slave cylinder piston, wherein said first non-abrasive fluid line comprises a non-abrasive fluid;

providing a first needle valve in said first non-abrasive fluid line between said second pump piston side of said first pump piston and said first slave cylinder piston side of said first slave cylinder; and opening said first needle valve to permit flow of said non-abrasive fluid between said second pump piston side of said first slave cylinder pump piston and said first piston side of said first slave cylinder to equalize said first pressure with said second pressure.

2. The process as recited in claim 1, further comprising:

providing a second process valve downstream from said first process valve in said flow stream, wherein the second pressure is provided on an inlet side of the second process valve and a third pressure is provided on an outlet side of said second process valve;

providing a second slave cylinder including a first second slave cylinder piston having a first slave cylinder piston side and a second slave cylinder piston side, wherein said second slave cylinder piston side of said second slave cylinder piston is in fluid communication with said flow stream;

providing a second non-abrasive fluid line connecting said second pump piston side of said first pump piston with said first slave cylinder piston side of said second slave cylinder piston, wherein said second non-abrasive fluid line comprises a non-abrasive fluid;

providing a second needle valve in said second non-abrasive fluid line between said second pump piston side of said first pump piston and said first slave cylinder piston side of said second slave cylinder piston; and opening said second needle valve to permit flow of said non-abrasive fluid between said second pump piston side of said first pump piston and said first slave cylinder piston side of said second slave cylinder piston to equalize said second pressure with said third pressure.

3. The process as recited in claim 1, further comprising closing said first needle valve subsequent to equalizing of said first and second pressures.

4. The process as recited in claim 3, further comprising providing a pressurizing stroke by said first pump piston on said flow stream subsequent to closing of said first needle valve.

5. The process as recited in claim 1, further comprising providing a reactor vessel downstream from said first process valve in said process flow stream.

6. The process as recited in claim 5, further comprising providing a product separator downstream from said reactor vessel.

7. The process as recited in claim 6, wherein said second first slave cylinder piston side of said first save cylinder piston is connected to said product separator by said flow stream.

* * * * *